United States Patent [19]

Loce et al.

[11] Patent Number: 5,113,202

[45] Date of Patent: May 12, 1992

[54] ELECTRONIC SINGLE PASS, TWO COLOR PRINTING SYSTEM

[75] Inventors: Robert P. Loce, Rochester; James J. Appel, Brighton, both of N.Y.

[73] Assignee: Xerox Corporation, Stamford, Conn.

[21] Appl. No.: 561,131

[22] Filed: Aug. 1, 1990

[51] Int. Cl.⁵ .................. G01D 9/42; G03G 15/01
[52] U.S. Cl. .................. 346/108; 346/157; 355/328
[58] Field of Search .......... 346/157, 108, 155; 355/328

[56] References Cited

U.S. PATENT DOCUMENTS

| | | | |
|---|---|---|---|
| 4,068,938 | 1/1978 | Robertson | 355/4 |
| 4,078,929 | 3/1978 | Gundlach | 96/1.2 |
| 4,367,925 | 1/1983 | Sprague et al. | 350/355 |
| 4,403,848 | 9/1983 | Snelling | 355/4 |
| 4,416,533 | 11/1983 | Tokunaga et al. | 355/4 |
| 4,477,175 | 10/1984 | Snelling | 355/3 R |
| 4,509,850 | 4/1985 | Weigl | 355/4 |
| 4,562,129 | 12/1985 | Tanaka et al. | 430/42 |
| 4,578,331 | 3/1986 | Ikeda et al. | 346/157 X |
| 4,731,634 | 3/1988 | Stark | 355/3 TR |
| 4,931,875 | 6/1990 | Tadauchi | 346/157 X |
| 4,970,562 | 11/1990 | Birnbaum et al. | 346/157 |
| 4,977,411 | 12/1990 | Pepe | 346/108 |

*Primary Examiner*—George H. Miller, Jr.

[57] ABSTRACT

A single pass highlight color printing system is enabled by utilizing the disparity between the on-time of a printing system and the on-time of an optical image bar. The image bar output is adapted to be separated into two image outputs which expose two separate areas of a photoreceptor. Each exposed area is developed by a toner of a desired color and the developed image, having two colors thereon, is transferred to a copy sheet to form a two-color output copy.

7 Claims, 3 Drawing Sheets

ELECTRONIC SINGLE PASS, TWO COLOR PRINTING SYSTEM

BACKGROUND AND INFORMATION DISCLOSURE STATEMENT

This invention relates to an electronic color printing system and, more particularly, to a color printing system which utilizes a linear optical image bar to form two-color images on a photoreceptor surface in a single pass.

In a business office environment, it is frequently desirable to produce output copies at high speeds of original documents containing highlighted portions. Typically the output copies will have information in red and black, but could also be two different colors. It is well known in the light-lens document scanning art how to produce two color output copies using a multi-pass system, one commercial example being the Canon 3625 copier. For this type of system, an operator utilizes a mimic-type electronic edit pad to delineate areas of an original it is desired to highlight. The coordinates of a selected area are entered into machine memory. During a first exposure cycle, all areas on the photoreceptor are erased save the selected highlight color area which is then subsequently developed with the appropriate color toner. The resulting image is transferred to a copy sheet, fused and returned to the developer station entrance zone where it is re-registered. A second exposure of the original is made and the highlight area only is erased. The resulting latent image is developed with conventional black toner, and transferred to the copy sheet which is then fused and the copy sheet conveyed to an output tray.

Other types of light-lens scanning systems are known in the art for producing highlight color copies in a single pass mode. One approach, disclosed in U.S. Pat. Nos. 4,078,929 and 4,068,938, is to form three or more discrete levels of photoreceptor discharge. One level (high) corresponds to black information, an intermediate level corresponds to white background and the third level corresponds to a highlight color, such as red. Toner particles of appropriate polarity are then sequentially applied to the exposed image areas and transferred to a copy sheet to form a highlight colored print. Another technique exemplified by U.S. Pat. No. 4,562,129 is to use a bipolar photoreceptor comprising multiple layers, each layer sensitive to a different color. The two discharge areas are then developed by developer units biased to appropriate charge levels.

The above systems describe a single-pass highlight color system, which is used in a copying environment wherein an original document is scanned by a light source and the reflected image is projected onto the photoreceptor. It is desirable to produce a two-color output copy in a printing environment when an original document has been captured electronically and is to be reproduced by modulating light on a photoreceptor by a raster output scanning (ROS) device. Various techniques are known in electronic printing art to produce two-color output prints, as described below.

U.S. Pat. No. 4,403,848, assigned to same assignee as the present invention, discloses a printing system utilizing a flying spot scanner. This system uses a modulated laser ROS to form separate exposures at different locations of a photoreceptor belt, each exposure representing a specific color. The separate exposures are obtained by splitting the laser output into two beams by, for example, a wedge mirror. Each latent image is exposed with a characteristic color toner and transferred sequentially to a copy sheet. This system, shown in FIGS. 1 and 2 of the patent, can be characterized as a single pass, multiple image system. FIG. 3 of the same patent shows another color printing embodiment wherein three lasers are modulated in accordance with scanned document information and three imaging beams are scanned across the moving charged photoreceptor creating three color separation images which are developed in succession to form a composite color image. This color image is thereafter transferred to a copy sheet and fused to provide a color copy. For each of the two embodiments disclosed in this patent, the color images are formed by directing the modulated laser output to the surfaces of a rotating polygon which then reflects (scans) the image across the photoreceptor surface. The major problem with this type of prior art color printing system is the difficulty in registering the color images in both the single pass and multiple pass modes. The rotating mass of the polygon presents the main difficulty in maintaining precise registration since it is subject to mechanical speed irregularities and vibration.

Other single-pass ROS systems, which use the technique of splitting a laser output into two or more beams, are disclosed in U.S. Pat. Nos. 4,578,331 and 4,416,533 (FIG. 7). In both of these scanning systems, the separated beams are directed to separate areas of the photoreceptor with each image being developed by toner of the desired polarity and color. U.S. Pat. No. 4,791,452 is similar in operation, but uses two separate laser sources to produce the separate image exposures.

Still further examples of single-pass ROS printing systems are as follows: U.S. Pat. No. 4,731,634 discloses a single-pass ROS printing system which utilizes a photoreceptor having a plurality of discharge levels. A single exposure is provided to discharge the charge retentive surface of the photoreceptor to at least four levels. The exposed surfaces then move past the plurality of development stations where toner is attracted to the predetermined potential level. Also, see U.S. Pat. No. 4,509,850 which discloses a single-pass printer wherein a laser output is directed to a photoreceptor surface to record either a modulated charged area or a continuously charged area. Two developer rolls apply toner of appropriate polarity to their respective charged surfaces.

An attractive alternative scanning system to the polygon ROS type of system disclosed in the above patents is the use of linear optical image bars. Optical image bars, as known in the art, comprise an array of optical picture elements (pixels), for converting a bit map pattern, usually represented by the information contents of electrical input data signals, into a corresponding spatially varying profile. Although there are a variety of applications for these image bars in a number of different fields, a significant portion of the effort and expense that have been directed to their development has been directed towards their application to electrophotographic printing where they provide a relatively low cost and reliable alternative to the flying spot raster scanners of the type disclosed in the above discussed patents. The optical image bar generates line-like image ray patterns, representative of the image signal input, on the surface of a photoreceptor. One example of an image bar type of printer is found in U.S. Pat. No. 4,477,175, where the image bar is composed of a plurality of individually activated illumination elements (LEDs). Another example is found in U.S. Pat. No. 4,367,925 where the image bar is composed of a plurality of individually activated electro-optic electrodes. Also known as an EO TIR (electro-optic total internal reflection) spatial light monitor. This type of device characteristically comprises a plurality of laterally separated, individually addressable electrodes which are maintained on, or closely adjacent to, a reflective surface of an optically transparent electro-optic element, such as a lithium niobate ($LiNbO_3$) crystal. In operation, substantially the full width of the electro-optic element of such a modulator is illuminated by a linearly polarized, transversely collimated light beam. Thus, when voltages representing the pixels of a linear pixel pattern (e.g., the pixels for a given line of an image) are applied to its individually addressable electrodes, the modulator spatially phase modulates the wavefront of the light beam in accordance with the applied pixel pattern. As a general rule, of course, the spatial wavefront modulation varies as a function of time in accordance with the pixel patterns for successive lines of a two dimensional image, thereby providing a line-by-line representation of the image.

The same advantages in speed are desirable in images by ROS systems. Applicants are aware of only one prior art embodiment of a single-pass image bar highlight color system disclosed in copending application U.S. Ser. No. 07/432,012 filed on Nov. 6, 1989 and assigned to the same assignee as the present invention. In that application, two image bar outputs are directed either simultaneously onto two photoreceptors with two associated development systems, or sequentially onto the same photoreceptor via belt transfer development system. It would be desirable to enable a single-pass color highlight system without requiring the use of two image bar ROS systems or the lower printing speed associated with the sequential embodiment.

According to the present invention, it has been found that the on-time of an image bar is separated into two equal time intervals; each time interval is used to write one image requiring one color development on the photoreceptor, while the other half of the line time is used to write another image of a second color, requiring a second color development in the other half. The separated exposed images are sequentially developed by toner of appropriate color. In one embodiment, an image bar of the type disclosed in U.S. Pat. No. 4,367,925 is adapted to transmit either S polarized light or P polarized light during one half of the raster on-time. In a second embodiment, an LED image bar output is split and directed through one or the other of a pair of linear gradient index lens arrays to separate areas of the photoreceptor. More particularly, the invention relates to a single-pass highlight color printer for forming line images on the surface of a photoreceptor including, in combination, a single image bar ROS for exposing two separate areas of a photoreceptor at two exposure stations, each exposure occurring during one-half of the on-time of said ROS, means for applying a charge potential to said exposure areas prior to said exposure, means for developing each exposed area with a developer of a different color, and means for transferring said developed image onto a copy substrate to form a two-color output copy.

DESCRIPTION OF THE INVENTION

Figure 1:
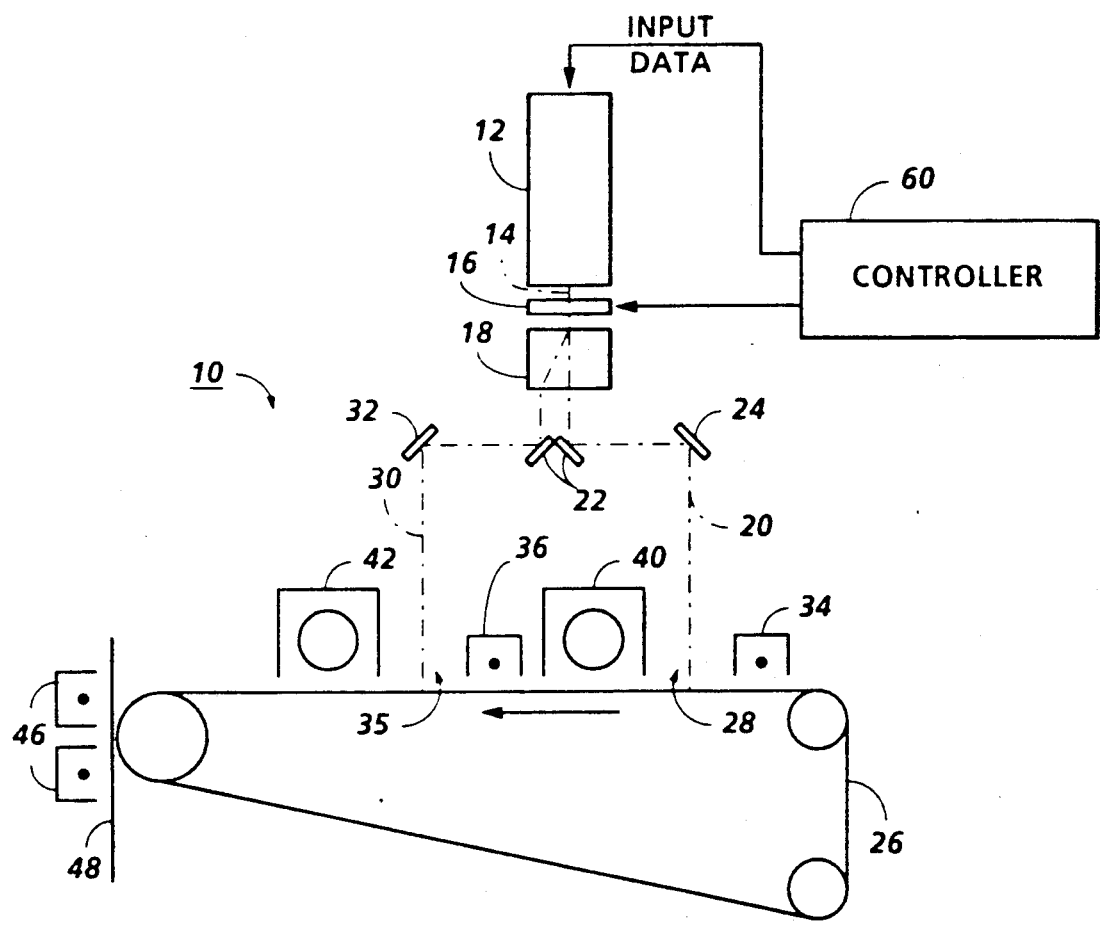
FIG. 1 is a schematic side view of a first embodiment of a printing system of the invention utilizing an image bar which has a polarized light output.

FIG. 1 shows a first embodiment of a single-pass highlight color printing system 10. An optical image bar ROS 12 is addressed by data signals representing the images to be reproduced in a highlight color print. ROS 12 can be of the type disclosed in U.S. Pat. No. 4,367,925, whose contents are hereby incorporated by reference. Output 14 is a modulated radiation beam of light polarized parallel to the plane of the figure. It is assumed that the input data signal pulses ROS 12 to produce an on-time period t. During the first half on time period t/2, polarized light output 14 passes into electronically controlled polarization rotator 16. For example, in its non-activated state, rotator 16 is adapted to transmit light polarized in the plane of the figure without alteration. When a voltage is applied to the rotator, this component rotates the polarization vector of the transmitted light perpendicular to the plane of the figure. Birefringent crystal 18 performs a spatial splitting of the light with the two different polarization directions. Light polarized parallel to the plane of the figure is directed along path 20 by mirrors 22, 24 to expose a line area of photoreceptor 26 at exposure station 28. During the second half of a ROS on-time, voltage is applied to the polarization rotator 16 causing it to rotate the plane polarization of the light perpendicular to the plane of the figure. The light polarized perpendicular to the plane of the figure is shifted by crystal 18 to travel along path 30 and is directed by mirrors 22, 32 onto the photoreceptor at exposure station 35. The thickness of the crystal 18 determines the width separating the two polarization components. It is understood that during each one-half on-time, another data input signal addresses the ROS to produce a first and second output. Data input and operation of rotator 16 are under the control of system controller 60 which is adapted to conventionally control other xerographic functions such as charge, development, fusing and transfer.

To summarize the exposure operation, the ROS is addressed by data signals representing a line of image information to be written onto the photoreceptor. The ROS polarized light output is transmitted by the rotator, polarized parallel or perpendicular to the plane of the figure depending on whether or not a voltage is applied to the rotator. The light polarized in the two different directions is directed to expose separate areas of the photoreceptor, with the line image corresponding to the data input signal. The line-at-a-time exposure continues until an entire image has been exposed.

Continuing further with the description of the xerographic process portion of the printing system, two charge stations 34,36 are arranged downstream and adjacent to exposure stations 28, 35. Charge stations 34,36 are adapted to apply a charge of a first and second polarity respectively to the photoreceptor 26 surface. Developer stations 40, 42 are positioned adjacent and upstream of the exposure stations 28, 35. Station 40 is adapted to apply a developer to the areas exposed at station 28 with toner of a first color. Station 42 is adapted to apply developer to the area exposed at station 35 with toner of a second color. The image emerging from second development station 42 thus has toner applied at the first development station and at the second development station, e.g. the two highlight colors are present on the same latent image. The two-colored, developed image is transferred at a detack transfer station 46 onto a copy substrate 48, which is moved into transfer relationship so as to receive the developed image formed in the two-color output print. A fusing operation is then performed at a fusing station (not shown) to produce the final output copy.

At the start of an operational cycle, the ROS 12 will operate at only one-half efficiency since no exposure is required at the second exposure station 35 until a first exposed area exposed at exposure station 28 arrives. Hence, during the start of operation, rotator 16 remains in a state which transmits light polarized parallel to the plane of the figure along path 20. The first exposed image is developed at development station 40, recharged at charge station 36 and re-exposed at exposure station 35. At this point, the ROS output begins to operate at optimum efficiency with light polarized perpendicular to the plane of the figure being transmitted by rotator 16 and crystal 18 along path 30 during one-half of a ROS on-time. In the second half of the on-time, light polarized parallel to the plane of the figure is provided in response to another data input pulse and is transmitted through crystal 18 and along path 20 to the first exposure station. Thus, line exposure alternates being stations 28 and 35, each line forming part of the image being reproduced. It is understood that the same image may be continually reproduced to produce multiple highlight color output copies of the same original document, or different output copies may be contemplated.

Figure 2:
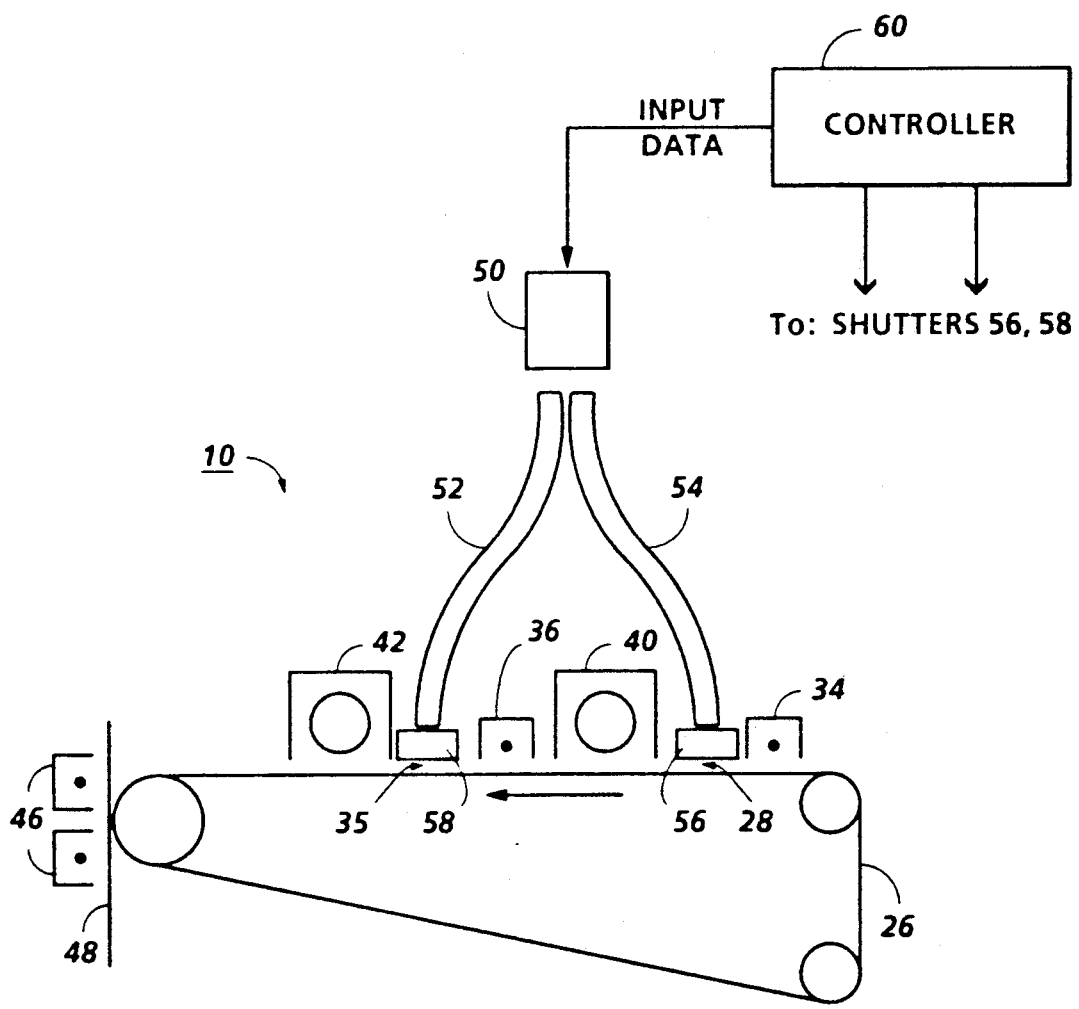
FIG. 2 is a schematic side view of a second embodiment of the printing system of the present invention utilizing a light emitting diode (LED) image bar as the ROS.

Turning now to FIG. 2, a second embodiment of the invention is described wherein an image bar ROS 50 comprises an array of individually addressable light emitting diodes (LEDs). An input data signal applied to the image bar ROS provides the modulated line output radiation pattern. Positioned within a viewing angle of the ROS output are a pair of gradient index lens arrays 52, 54. ROS 50 output is transmitted and focused at exposure stations 28 or 35, depending on the state of liquid crystal shutters 56, 58, respectively. When shutter 58 is closed, shutter 56 will be opened and lens 54 will image the output at exposure station 28. When shutter 56 is closed, shutter 58 will be open and the line output will be imaged at exposure station 35 by lens 52. It is understood that the operation of this shutter and the application of the input signals applied to the ROS are under control of the controller 60 which opens and closes the shutter during the one-half on-time cycle. The development and transfer functions are enabled as described above in connection with the FIG. 1 embodiment. Linear lens arrays 52, 54 have a curved configuration to lengthen the optical path to satisfy total conjugate requirements. Multimode gradient index fibers, several inches in length or longer, would have sufficient flexibility and total conjugate to be used as fibers in arrays 52,54.

Figure 3:
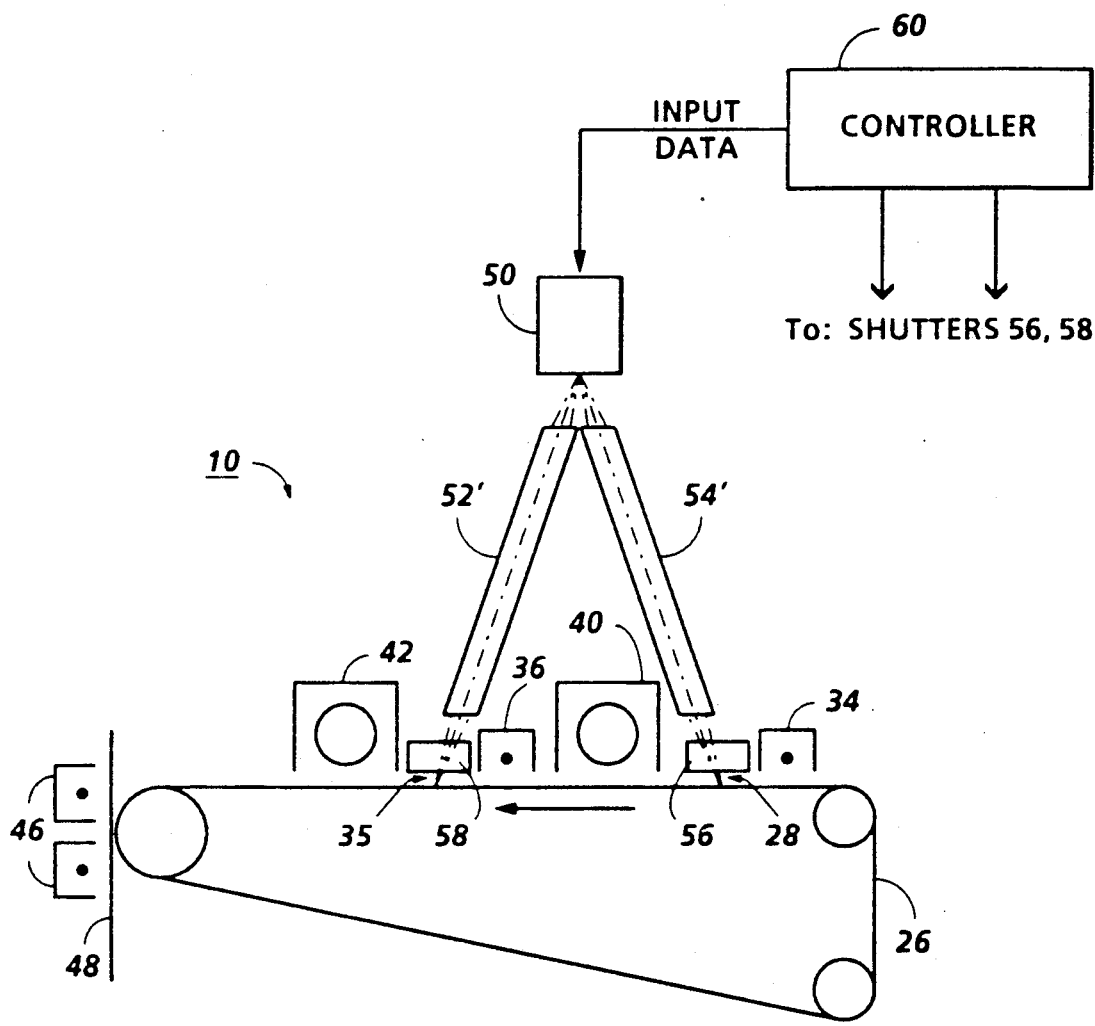
FIG. 3 is an alternate embodiment of the FIG. 2 embodiment.

An alternate embodiment to the FIG. 2 embodiment is shown in FIG. 3. There, lens arrays 52', 54' are straight, rather than curved, and use long total conjugate fibers. The operation of the system is otherwise the same as for the FIG. 2 embodiment.

While the invention has been described with reference to the structure disclosed, it will be appreciated that numerous changes and modifications are likely to occur to those skilled in the art, and it is intended to cover all changes and modifications which fall within the true spirit and scope of the invention.

We claim:

1. A single pass highlight color printing system for forming images on the surface of a photoreceptor including, in combination,
   a single image bar ROS for exposing two separate areas of the photoreceptor at two exposure stations, each exposure occurring during one-half of the on-time of said ROS,
   means for applying a charge potential to said separate photoreceptor areas prior to said exposure,
   means for developing each exposed area with a developer of a different color, and
   means for transferring each developed image onto a copy substrate to form a two-color output copy.

2. The printing system of claim 1 wherein said image bar ROS has an output which comprises polarized components parallel and perpendicular to the plane of the figure, and further including optical means for transmitting one polarized component during one-half the on-time of the ROS, and the other polarized component during the second half of the on-time, and for separating the two transmitted components and directing the components onto two separate exposure areas.

3. The printing system of claim 1 wherein said image bar ROS comprises a plurality of individually addressable, light emitting diodes and wherein the output of said image bar is transmitted by a first gradient index lens array during a first one-half on-time of the ROS, and by a second gradient index lens array during a second one-half on-time of the ROS, to the first and second exposure stations, respectively.

4. The printing system of claim 3, further including liquid crystal shutter means which alternately transmit and block the light during the particular on-time interval.

5. The printing system of claim 4 wherein said gradient index lens arrays are planar in the transmitting direction.

6. The printing system of claim 4 wherein said gradient index lens arrays are curved in the transmitting direction.

7. In a printing system for producing highlight color output copy prints, including a xerographic system for processing images including a movable photoreceptor, means to charge the photoreceptor, an exposure station wherein said photoreceptor is exposed, means for developing images on said photoreceptor, and means for transferring developed images from said photoreceptor to a copy substrate, the combination of
   an optical image bar having a plurality of individually addressable exposure elements, said image bar adapted to provide a modulated ratiation output in response to image signals to said image bar, optical means adapted to separate said radiation output into two images during successive one-half on-times of said image bar and to direct the images to a first exposure area of the photoreceptor and wherein the charge means includes a first charge means downstream from and adjacent said first exposure area, and second charge means downstream and adjacent a second exposure area, and wherein said developer means includes a first developer unit positioned upstream and adjacent to said first exposure area, said first development means adapted to develop said first exposure area with a toner of a first color, and a second developer unit positioned adjacent to and upstream of said second exposure area, said second developing means adapted to develop said second exposure area with a toner of said second color.

* * * * *